Oct. 23, 1962     E. W. RICH     3,059,943
THREE WHEELED COASTERS

Filed Jan. 6, 1961     2 Sheets-Sheet 1

INVENTOR
Everett W. Rich

United States Patent Office 3,059,943
Patented Oct. 23, 1962

3,059,943
THREE WHEELED COASTERS
Everett W. Rich, 424 W. Pardee Lane, Stockton, Calif.
Filed Jan. 6, 1961, Ser. No. 81,194
4 Claims. (Cl. 280—87.02)

The present invention generally relates to a wheeled toy, and more particularly to an occupant propelled vehicle of the coaster wagon or scooter type only in this case there are three supporting wheels, and the occupant propels the vehicle with one leg, with the foot contacting the road surface.

The primary objective of the present invention is to provide a three wheeled toy generally in the form of a conventional coaster wagon except which the two front wheels are pivotal about a vertical axis or kingpin, for controlling the direction of movement of the vehicle with the single rear wheel rotatable but non-pivotal in relation to the main frame of the vehicle.

A further object of this invention is to provide a coaster vehicle used in the same manner as the conventional coaster wagon, but because of the steering arrangement this invention is much more stable, especially in turning.

A further object of the present invention is to provide a three wheeled coaster vehicle that does not tip easily, easy to propel and relative inexpensive to manufacture. Still another object of this invention is to provide a coaster vehicle in which the operator's weight, on his knee, is center to the vehicle which accounts for this wheeled toy being safer in turns, this frame also allows more clearance for the driving leg.

These together with other objects and advantages which will become subsequently apparent, reside in the details of construction and operation as more fully hereinafter described and claimed, reference being had to the accompanying drawings forming a part hereof, wherein like numerals refer to like parts throughout and in which:

Figure 1:
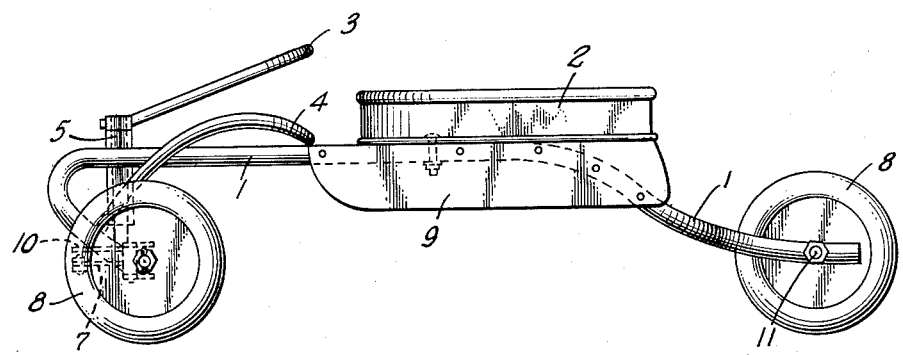
FIG. 1 is a side elevation showing tubing construction and showing the relation of knee and hand rest to the steering arm mechanism.
Figure 2:
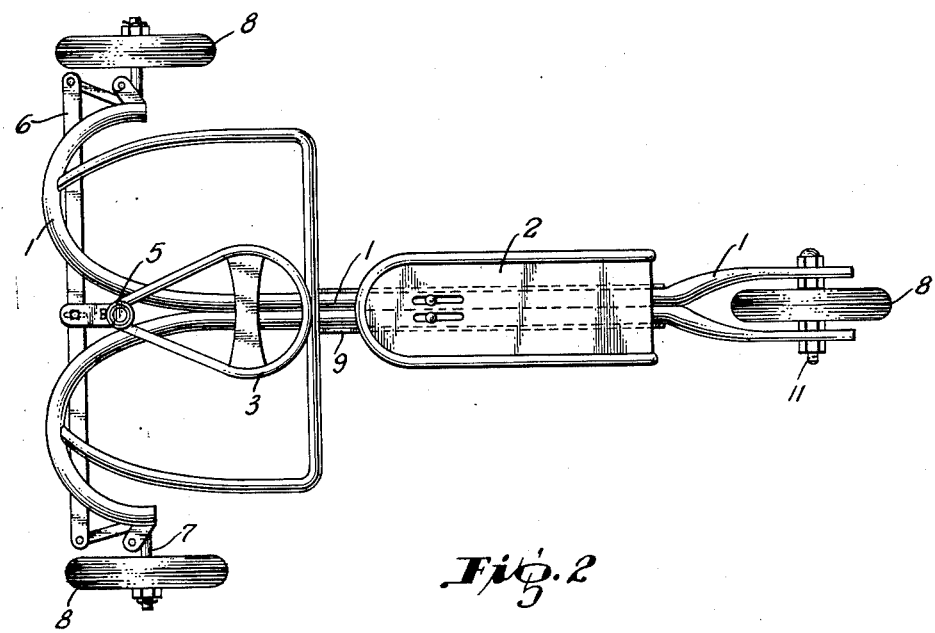
FIG. 2 is a top plan view of the construction of FIGURE 1.
Figure 3:
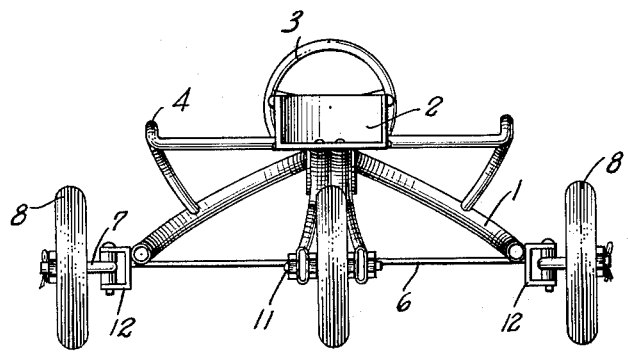
FIG. 3 is a rear view of wheeled toy showing entrance to knee box.
Figure 4:
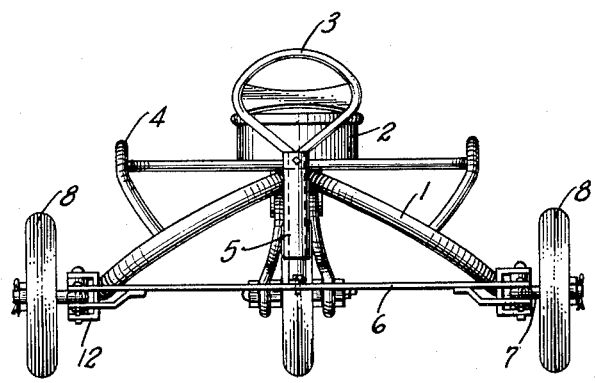
FIG. 4 is a front view showing steering mechanism.

Referring now specifically to the drawings the numeral 1 designates a tubular frame extending the length of the coaster, each of the two frame tubings are curled apart in the front, to receive king pin couplings 12, and in the rear are also separated to form the fork for rear wheel 8.

The knee box 2 is secured to the frame members 1 by carriage bolts in the frame and elongated holes in the base of the knee box 2 which allows for adjustment forward and rear. The numeral 4 designates the frame support member and the hand rest, as illustrated, it is welded at right angle to the frame on top of tubular frame 1 and curves down to form a supporting member between steering journal 5 and king pin coupling 12. The numeral 3 designates a modernistic steering arm that swings in an arc parallel to frame 1, to right and left, pivoting in the steering journal 5 which encloses an elongated steering rod with an offset arm and pin 10, the pin engages tie rod 6 in a hole elongated at right angles to the tie rod 6; this allows the rotational motion of the steering rod 10 to the lateral transverse movement of the tie bar 6 for pivoting both the front wheels 8 in the same direction at the same time. The numeral 11 designates an axle which is non-rotatable in the frame 1 and held secure by a thin lock nut on each side of the fork in frame 1, the rear wheel 8 rotates on said axle. The numeral 9 designates side aprons which allow the impression of a lower profile and also supports the tubular frame member 1.

Now referring to FIGURE 1, the child operator places left hand on frame hand rest 4, places his right knee in knee rest 2, then places the right hand on modernistic steering arm 3 and with the left leg propels the coaster. Of course it is understood that the coaster may be operated from either side, hands and legs placed to the convenience of the operator.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What I claim as new is as follows:

1. A three wheeled coaster comprising a longitudinal frame the major portion of which is narrow and horizontal, downwardly and laterally projecting extensions on the front forward end of the horizontal frame portion, relatively widely spaced front wheels supported and projecting laterally out from the lower ends of the extensions, a rear centrally disposed wheel supporting the frame at its rear end, an elongated leg and knee rest mounted on the major narrow portion of the frame ahead of the rear wheel, said rest being relatively narrow but wider than the frame portion thereunder, and means to steer the front wheels including a centrally disposed steering arm disposed at its rear end a short distance above and relatively close to the front end of the knee rest.

2. A coaster, as in claim 1, with a hand rest rigid with the frame and including a transverse member substantially at a level with the horizontal portion of the frame a relatively short distance ahead of the knee rest and extending an equal distance on opposite sides of said frame portion.

3. A coaster, as in claim 1, with a combination frame bracing member and hand rest comprising a rear transverse portion extending across and secured to the horizontal frame portion at a point adjacent and ahead of the knee rest, and other portions extending forwardly and downwardly from the ends of said transverse portion and rigidly connected at their forward ends to said frame extensions intermediate the ends thereof.

4. A coaster, as in claim 1, with rigid side aprons secured to and depending under and for the full length at least of the leg and knee rest.

References Cited in the file of this patent

UNITED STATES PATENTS

| | | |
|---|---|---|
| D. 127,915 | Weller | June 24, 1941 |
| D. 145,513 | Dodegge | Sept. 3, 1946 |
| D. 149,552 | Gruenberger | May 11, 1948 |
| 1,662,292 | Bender | Mar. 13, 1928 |
| 1,666,827 | McFarlan | Apr. 17, 1928 |